United States Patent
Mee et al.

(10) Patent No.: US 7,065,324 B2
(45) Date of Patent: Jun. 20, 2006

(54) CONTROLLING PERFORMANCE MEASUREMENTS IN A TELECOMMUNICATIONS NETWORK

(75) Inventors: Jerome Mee, Four Roads (IE); Bernard Brady, Borris (IE); Marie Moynihan, Bishopstown (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 10/275,925

(22) PCT Filed: May 4, 2001

(86) PCT No.: PCT/EP01/05051

§ 371 (c)(1),
(2), (4) Date: Apr. 15, 2003

(87) PCT Pub. No.: WO01/86987

PCT Pub. Date: Nov. 15, 2001

(65) Prior Publication Data

US 2003/0157896 A1    Aug. 21, 2003

(30) Foreign Application Priority Data

May 12, 2000   (GB) ................................ 0011535.2

(51) Int. Cl.
*H04B 17/00* (2006.01)

(52) U.S. Cl. ................... 455/67.11; 455/423; 455/424; 370/332; 370/333; 370/252; 370/253; 370/241.1; 370/244; 370/903; 342/357.1; 342/357.13

(58) Field of Classification Search ................ 455/423, 455/67.11; 370/332, 333, 252, 253, 235, 370/241.1, 242, 244, 907; 342/357.1, 357.06, 342/357.13

See application file for complete search history.

(56) References Cited

U.S. PATENT DOCUMENTS

| | | | |
|---|---|---|---|
| 5,638,514 A | | 6/1997 | Yoshida et al. ......... 395/200.11 |
| 5,655,071 A | | 8/1997 | Habbe et al. .......... 395/183.01 |
| 5,675,724 A | * | 10/1997 | Beal et al. ..................... 714/4 |
| 5,704,036 A | * | 12/1997 | Brownmiller et al. ........ 714/43 |
| 5,768,255 A | * | 6/1998 | Brownmiller et al. ...... 370/248 |
| 5,768,261 A | * | 6/1998 | Brownmiller et al. ...... 370/252 |
| 5,778,184 A | * | 7/1998 | Brownmiller et al. ...... 709/224 |
| 5,787,074 A | * | 7/1998 | Brownmiller et al. ...... 370/244 |
| 5,796,723 A | * | 8/1998 | Bencheck et al. .......... 370/252 |
| 5,845,062 A | * | 12/1998 | Branton et al. ............... 714/25 |
| 5,913,036 A | * | 6/1999 | Brownmiller et al. ...... 709/224 |
| 6,061,332 A | | 5/2000 | Branton, Jr. et al. ........ 370/241 |
| 6,339,750 B1 | * | 1/2002 | Hoyer et al. ................ 702/182 |

FOREIGN PATENT DOCUMENTS

| | | |
|---|---|---|
| EP | 0 347 360 | 12/1989 |
| WO | WO 93/15569 | 8/1993 |
| WO | WO 95/04419 | 2/1995 |

\* cited by examiner

Primary Examiner—Marceau Milord

(57) ABSTRACT

A network management system, for example for use in a telecommunications network, includes a performance measurement tool for carrying out one or more performance measurements relating to physical or logical components of the network. A performance management controller includes a control unit, a list of performance measurement groups, a list of logical/physical components and a list of predefined time schedules. Upon receiving information indicating that a performance measurement threshold has been crossed, the control unit determines whether the group of performance measurements associated with that threshold is active, and if not, automatically activates the appropriate performance measurement group. In this way, the system is able to adaptively change the performance measurements in response to actual performance measurements, thereby ensuring that the most appropriate measurements are carried out.

29 Claims, 3 Drawing Sheets

CONTROLLING PERFORMANCE MEASUREMENTS IN A TELECOMMUNICATIONS NETWORK

FIELD OF THE INVENTION

The invention relates to a network management system and method, and in particular, to a network management system and method in which performance measurements are controlled according to performance measurement thresholds.

BACKGROUND TO THE INVENTION

A network such as a telecommunications network typically contains a number of performance management tools for monitoring the performance of the network. These tools are used to monitor the performance of various aspects of the network, for example, the number of telephone calls dropped in a particular cell of a cellular telephone network. The user of the performance management tools has control over the selection, activation and deactivation of performance measurement reports in the network.

Default performance measurements are selected from the performance management tool in order to monitor the network performance at all times.

Performance threshold measurements may be used to indicate potential problems in the network when a measurement drops below or increases above a predetermined threshold level. Examples include: the number of dropped calls in a particular cell exceeding an acceptable threshold level; the signal-to-interference ratio on a radio link crossing a certain threshold, thereby indicating poor voice quality for a mobile user; the amount of traffic in Kbytes per second (Kbps) falling below a certain level, indicating a possible dead or dying cell; the number of packets for a packet data user having a time delay greater than a certain time threshold (the latter example also indicating that too many users have been allowed access to the network).

EP 0,347,360 is an example of a system for isolating and diagnosing problems in a data communication network.

While the performance measurements mentioned above are useful for indicating potential problems arising in the network, there is no means of automatically activating other, more relevant, performance measurements, so that the potential problem area can be observed further.

U.S. Pat. No. 5,638,514 is an example of a system for supervising network equipment, with the aim of reducing the amount of performance data being gathered. This is achieved by updating a status table in accordance with the performance data being gathered. However, this system requires a complex hierarchical system for minimising the amount of performance data being gathered.

The aim of the present invention is to overcome the disadvantages associated with the prior art by providing a network management system and method in which a group of performance measurements are activated and/or deactivated in response to performance measurement thresholds being crossed.

SUMMARY OF THE INVENTION

According to a first aspect of the present invention, there is provided a method of automatically controlling performance measurements in a network, the method comprising the steps of:

(a) receiving threshold information, the threshold information indicative that a performance measurement has crossed a particular threshold;

(b) determining whether a group of performance measurements associated with the particular threshold information is already active; and if not, (c) activating the group of performance measurements.

According to another aspect of the present invention, there is provided a performance management controller for use in a network in which a plurality of performance measurements are carried out, the performance management controller comprising:

means for receiving threshold information, the threshold information indicative that a performance measurement has crossed a particular threshold;

means for determining whether a group of performance measurements associated with the particular threshold information is already active; and if not, means for activating the group of performance measurements.

According to yet another aspect of the present invention, there is provided a network management system as defined in the appended claims.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF A PREFERRED EMBODIMENT OF THE INVENTION

Figure 1:
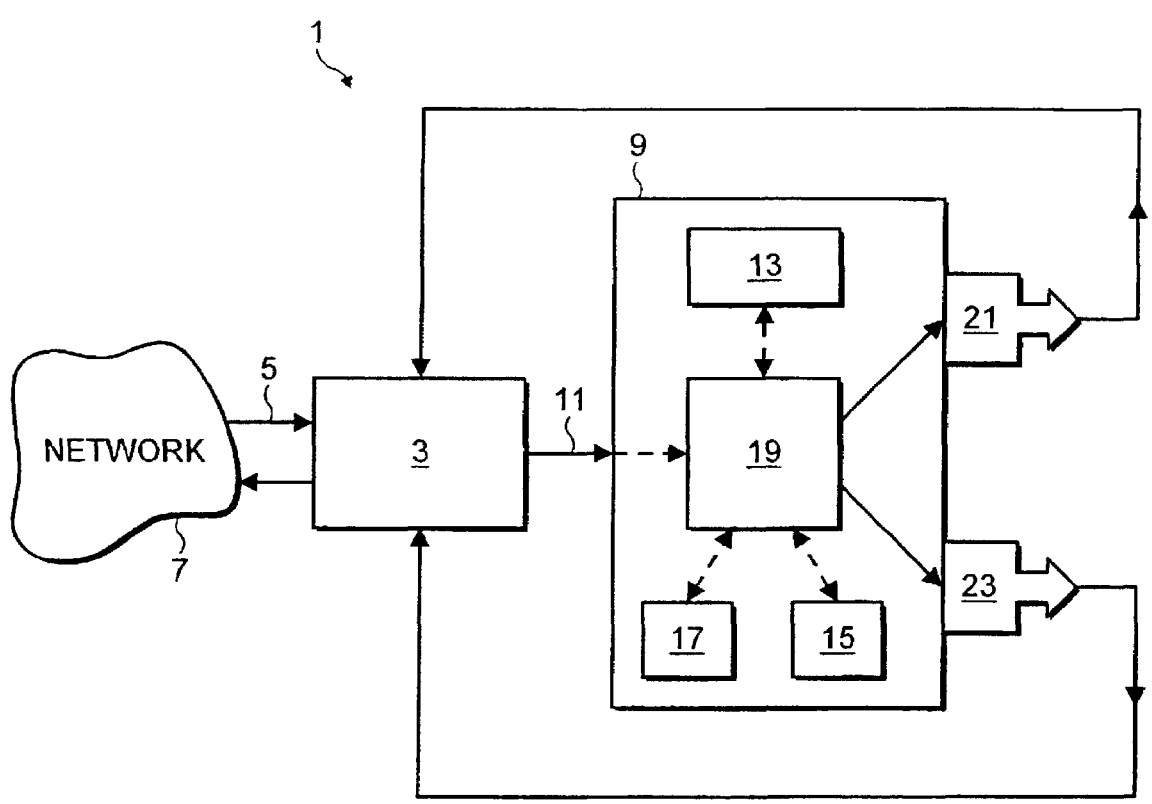
FIG. 1 shows a network management system according to the present invention.

A network management system 1 comprises a performance management tool 3 for carrying out a number of performance measurements 5 in a network 7. The performance measurements 5 relate to physical or logical components of the network 7. Each performance measurement 5 has a related performance threshold. The performance measurements 5 are carried out to monitor the functioning of the network 7, such as predicting traffic, detecting problems, anticipating potential problems, and many other functions.

A performance management controller 9 according to the present invention receives performance threshold information 11 from the performance management tool 3. The performance threshold information 11 indicates whether any of the performance measurements 5 have crossed a predetermined threshold. For example, if the performance measurement relates to the number of dropped calls in a cell, the performance management tool 3 sends performance threshold information 11 to the performance management controller 9, indicating that the threshold has been crossed, and the performance measurement is "unsafe" or "unacceptable".

The performance management controller 9 comprises a list of performance measurement groups 13, a list of logical/physical components of the network 15, a list of predefined time schedules 17, and a control unit 19.

Examples of "physical" components include network links, or a hardware board (such as a power amplifier which assigns different power levels to different users based on either pre-configured power settings, or on request, depending on the distance of a mobile user from a base station). Another example of a physical component is a processor within a network node, which is provided for handling a specific task such as running a Java Virtual Machine for that node, or acting as a router for packet data calls.

An example of a "logical" component is a network cell. Other examples include service types based on different data rates, for example, service type "A" having a data rate of X and a priority of Y.

Performance measurements are grouped according to their relationship to a particular performance threshold, and stored in the list of performance measurement groups 13. Thus, the performance measurement group contains a list of performance measurements which should be made, in the event that a particular performance threshold is exceeded.

For example, this can be applied where the physical link is a hardware board, such as a board which controls access into a network (e.g. a receiver for a mobile base station). If the number of failed accesses exceeds a certain level, it would be interesting to know how many access attempts were received by that board, how many were successful, what the performance level is for similar or neighbouring board(s), the percentage usage level on the board or the sub-components of the board (to determine whether only part of the board is problematic).

Thus, the threshold information relating to failed access attempts could be linked to a group of performance measurements as set out below:

1. Measure the number of access attempts that have been received for a board.
2. Measure the number of access attempts that have been successful.
3. Measure the number of access attempts that have been received in a neighbouring board(s).
4. Measure the number of successful attempts in the neighbouring board(s).
5. Measure the percentage usage level for the board.
6. Measure the percentage usage level for sub-components of the board.

In this way, if the threshold level relating to the number of failed access attempts is crossed, a predetermined group of performance measurements can be activated to provide useful information.

Each of the predefined time schedules in the list of predefined time schedules 17 contains information relating to a specific performance measurement group. This information corresponds, for example, to the point in time at which the performance measurement group should be activated, and the length of time the performance measurement group should remain activated.

In addition, hysteresis may be built into the system, thereby avoiding any problems being caused by a dynamic threshold measurement crossing a particular threshold level at frequent intervals. For example, to avoid frequent activation/deactivation of a performance measurement group, a threshold measurement has to cross a particular threshold level, in either direction, for a predetermined period of time before an associated performance measurement group is activated/deactivated.

Each of the performance measurement groups is also related to one or more of the logical or physical components in the network, which are listed in the list of logical or physical components 15. Thus, each performance measurement group relates to performance measurements which should be made on one or more network components. This is analogous to the way in which a performance measurement group is related to a particular threshold, as described above.

Preferably, therefore, the performance measurements groups are based on the same logical and physical components as the performance thresholds. In this way, the performance management tool 3 and the performance management controller 9 are able to understand one another, and report on the same measurable components.

It is noted, however, that the invention is not limited to performance measurements being linked to the same logical/physical components as the-thresholds. For example, a threshold measurement relating to a cell component could be used to activate a related measurement for a link component. In such an embodiment, the performance measurement tool and the performance measurement controller are able to understand one another if the network components are identified using a naming protocol which is well known in the art.

The performance management controller 9 has activating means 21 for activating a group of performance measurements, for example by instructing the performance management tool 3. The performance management controller 9 also comprises deactivating means 23 for deactivating a group of performance measurements, again by instructing the performance management tool 3.

Figure 2:
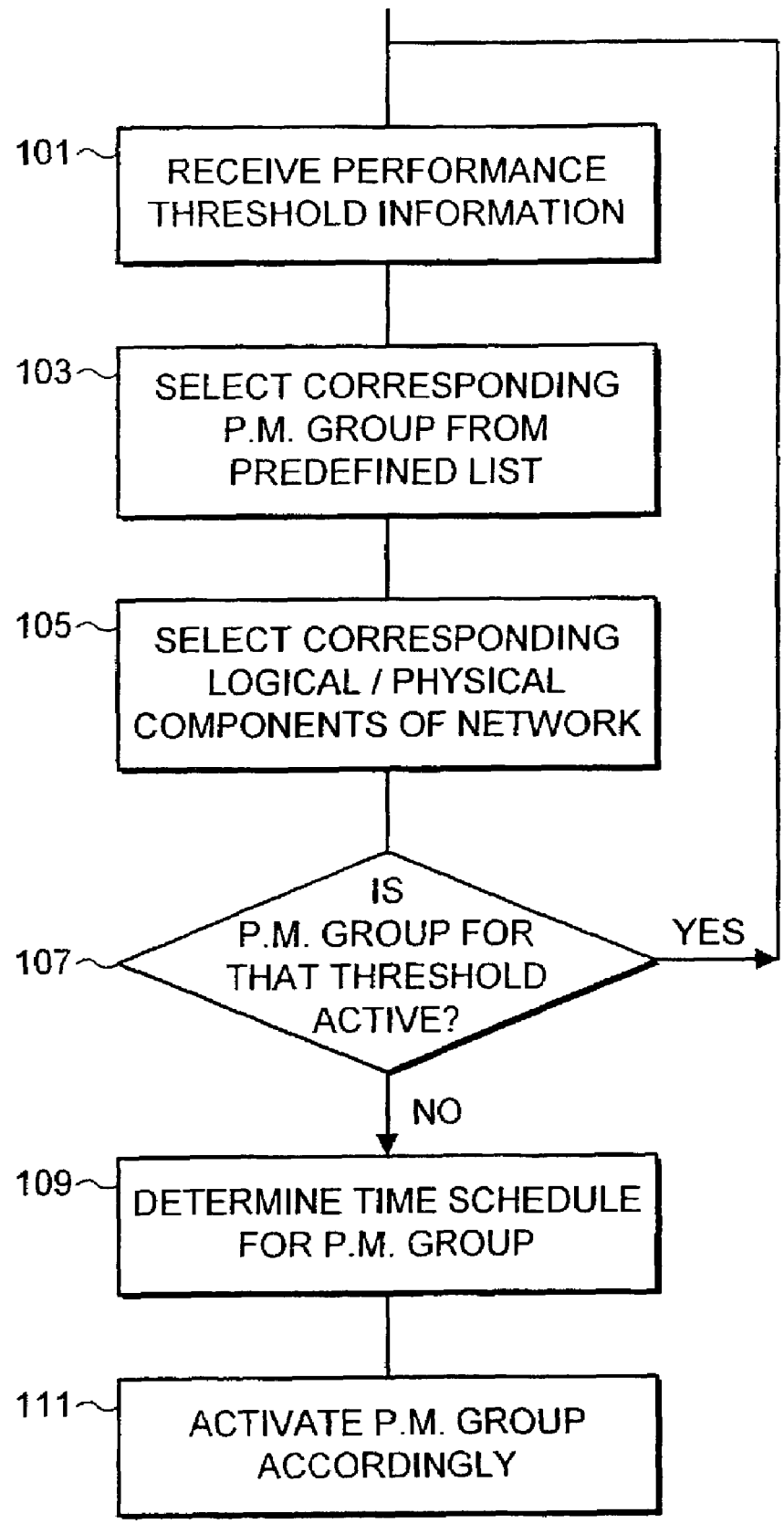
FIG. 2 shows the operation of the performance measurement controller of FIG. 1 when activating performance measurements.

Reference will now be made to FIG. 2, which describes the operation of the network management controller 9 of FIG. 1.

The control unit 19 of the performance management controller 9 receives performance threshold information 11 from the performance measurement tool 3, step 101. The performance threshold information 11 reports that a particular performance measurement has crossed from being in a "safe" or "acceptable" state to being in an "unsafe" or "unacceptable" state.

Having received this information, the control unit 19 selects the relevant performance group for that threshold information, from the list of performance measurement groups, step 103.

Next, the control unit 19 selects the logical or physical components of the network which correspond to the threshold that has been crossed, step 105, using the information stored in the list of physical/logical components 15.

The control unit 19 then determines if the performance measurement group relating to that particular threshold is active, step 107. If the relevant group is active, then the control unit does nothing.

However, if the relevant performance measurement group is not active, then the control unit takes the necessary steps to activate the performance measurement group.

This comprises accessing the list of predefined time schedules 17 to determine when the performance measurement group should be activated, and for what duration it should remain activated, step 109.

Using the information determined above, the control unit 19 activates the relevant performance measurement group, step 111.

It is noted that step 105 may be removed if the received threshold information has the relevant information embedded therein, i.e. if the threshold information contains information identifying the network component.

Thus, the performance management controller 9 described above enables the monitoring of the network to be adaptively changed, so that the most relevant performance data can be gathered in response to real time network occurrences.

The performance measurement group may be subsequently deactivated in accordance with the time schedule for the particular performance measurement group in question.

Figure 3:
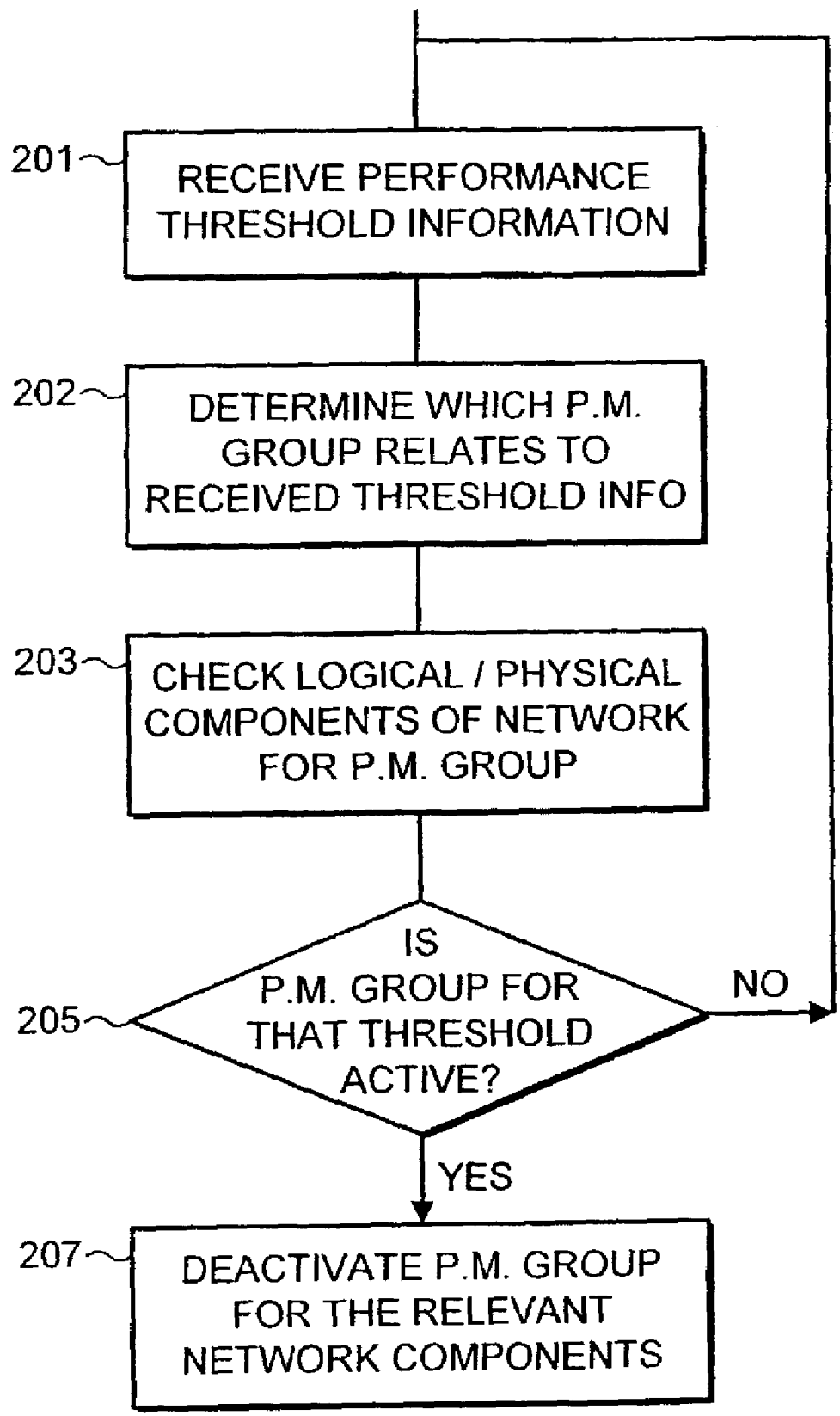
FIG. 3 shows the operation of the performance management controller of FIG. 1 when deactivating performance measurements.

Alternatively, the performance measurement group may be deactivated in response to its related threshold information crossing back into the "safe" region. FIG. 3 shows the procedure for deactivating the performance measurement-group in this situation.

The control unit 19 receives performance threshold information 11 from the performance management tool 3 when a threshold crosses back into the "safe" or "acceptable" state, step 201.

The control unit 19 then determines which performance measurement group relates to received threshold information, step 202.

Next, the control unit 19 checks the logical or physical components of the network for which the performance measurement group is active, step 203. It is noted that this step may be omitted if the threshold information contains information identifying network components.

The control unit then determines whether the performance measurement group for that threshold is active, step 205. If not, for example because it has previously been deactivated using the time schedule for that group, then no action is taken.

However, if the performance measurement group is still active, then the control unit deactivates the performance measurement group for the relevant network components, step 207.

The deactivation of the performance measurements in this manner, i.e. when not required, means that wasteful measurements are not carried out.

The different methods of deactivating the performance measurement groups (i.e. either in response to the time schedule or in response to the threshold crossing back into the "safe" region) may be configurable so that, if desired, one can take precedence over the other.

The invention described above enables a group of related performance measurements to be automatically activated when a potential problem is detected, and automatically deactivated when a potential problem is resolved.

Although the activation and deactivation of performance measurement groups has been described as taking place immediately after a threshold has been crossed, it is possible to incorporate a delay, such that the performance measurement groups are only activated or deactivated after a threshold has been crossed for a predetermined length of time. Thus, if the crossing of a performance threshold is very frequent, the activation and deactivation of the related performance measurement group can be delayed, thereby avoiding the undesirable effect of the measurements being changed too often.

Each of the parameters mentioned above, (for example, the definition of the group of performance measurements, the relationship between a performance measurement and a physical/logical component, the relationship between a threshold and a performance measurement group, or the threshold information for a given measurement), may be programmed by a user.

The invention enables potential problems to be prevented by automatically activating performance measurements to monitor potential problems before the actual problem occurs.

Furthermore, if a problem has occurred, the automatic activation of the relevant performance measurements means that the performance data can be used to form historical data, which can then be used to predict or monitor trends in potential trouble areas.

The invention reduces the number of unnecessary measurements being collected when not required, by automatically deactivating performance measurements for areas where there currently seems to be no need for monitoring.

Although the invention has been described in relation to a group of performance measurements being activated when a threshold has been exceeded and deactivated when the measurement has fallen below the threshold, the invention is equally applicable in reverse, i.e. whereby a performance measurement group is activated when a measurement falls below a threshold and deactivated when it exceeds the threshold.

In the description above, the activation of a group of performance measurements has been described as beginning all the measurements within that group. Similarly, the deactivation of a group of performance measurements has been described as ceasing all performance measurements within that group.

However, it is noted that the activation of a group of performance measurements can also result in certain performance measurements within the group being started and others being ceased. Likewise, the deactivation of a group of performance measurements can result in certain performance measurements within that group being ceased, and others being started.

It is noted that the various options described above may be programmed or configured by a user.

Other modifications which are obvious to a person skilled in the art may be made without departing from the scope of the invention, as defined in the appended claims.

The invention claimed is:

1. A method of automatically controlling performance measurements in a network, the method comprising the steps of:
   receiving threshold information, the threshold information indicating that a performance measurement has crossed a particular threshold;
   determining which group of performance measurements is associated with the particular threshold being received;
   selecting logical or physical components of the network for which the performance measurements are to be activated;
   determining whether a group of performance measurements associated with the particular threshold information is already active; and,
   if it is determined that the group of performance measurements associated with the particular threshold information is not already active, activating the group of performance measurements.

2. The method as claimed in claim 1, wherein the step of activating further comprises:
   determining a time schedule for activating the group of performance measurements; and
   activating the group of performance measurements accordingly.

3. The method as claimed in claim 2, wherein the time schedule indicates when the group of performance measurements should be activated and a duration for which the group of performance measurements should remain active.

4. The method as claimed in claim 1, wherein the group of performance measurements is activated only after the corresponding threshold has been exceeded for a predetermined period.

5. The method as claimed in claim 1 further comprising the step of:

determining whether the performance measurement has fallen below any threshold; and if it is determined that the performance measurement has fallen below any threshold, determining which group of performance measurements is associated with the particular threshold;

determining whether the determined group of performance measurements is already active; and if it is determined that the group of performance measurements is already active, deactivating the group of performance measurements accordingly.

6. The method as claimed in claim 5, wherein deactivation of the group of performance measurements only takes place after the corresponding measurement has fallen below the threshold for a predetermined period.

7. The method as claimed in claim 1, further comprising the step of defining a list of performance measurements.

8. The method as claimed in claim 1, wherein each performance measurement has a predefined relationship with a performance threshold.

9. The method as claimed in claim 1, wherein the performance measurements are grouped according to their relationship to performance thresholds.

10. The method as claimed in claim 1, wherein each group of performance measurements is related to one or more logical or physical components in the network.

11. The method as claimed in claim 10, wherein the performance measurements are based on the same logical or physical components as the performance thresholds.

12. The method as claimed in claim 1, wherein the thresholds are set such that the crossing of a threshold indicates a potential problem.

13. The method as claimed in claim 1, wherein the performance measurement is used to predict potential trouble areas.

14. A performance management controller for use in a network, a plurality of performance measurements being carried out in the network, the performance management controller comprising:

means for receiving threshold information;

wherein the threshold information indicative that a performance measurement has crossed a particular threshold;

means for determining whether a group of performance measurements associated with the particular threshold information is already active, said means for determining further comprising:

means for determining which group of performance measurements is associated with the particular threshold information; and means for selecting logical or physical components of the network for which the performance measurements are to be activated; and means for activating the group of performance measurements responsive to a determination that the group of performance measurements associated with the particular threshold information is not already active.

15. The performance management controller as claimed in claim 14, wherein the means for activating the group of performance measurements further comprises:

means for determining a time schedule for activating the group of performance measurements; and means for activating the group of performance measurements accordingly.

16. The performance management controller as claimed in claim 15, wherein the means for determining the time schedule comprises means for determining when the group of performance measurements should be activated and a duration of the measurements.

17. The performance management controller as claimed claim 14, further comprising delay means for delaying activation of the group of performance measurements until the corresponding threshold has been exceeded for a predetermined period.

18. The performance management controller as claimed in claim 14, further comprising:

means for determining whether a performance measurement has fallen below any threshold; and means for determining the group of performance measurements associated with the particular threshold;

means for determining whether the group of performance measurements is already active; and means for deactivating the group of performance measurements accordingly responsive to a determination that the group of performance measurements associated with the particular threshold information is already active.

19. The performance management controller as claimed in claim 18, wherein the means for deactivating the group of performance measurements further comprises delay means for delaying deactivation until the corresponding measurement has fallen below the threshold for a predetermined period.

20. The performance management controller as claimed in claim 14, further comprising means for defining a list of performance measurements.

21. The performance management controller as claimed in claim 14, wherein each performance measurement has a predefined relationship with a performance threshold.

22. The performance management controller as claimed in claim 14, wherein the performance measurements are grouped according to their relationship to performance thresholds.

23. The performance management controller as claimed in claim 22, further comprising means for storing a list of performance measurement groups.

24. The performance management controller as claimed in claim 14, wherein each group of performance measurements is related to one or more logical or physical components in the network.

25. The performance management controller as claimed in claim 24, wherein the performance measurements are based on the same logical or physical components as the performance thresholds.

26. The performance management controller as claimed in claim 14, wherein crossing of a threshold indicates a potential problem.

27. The performance management controller as claimed in claim 14, wherein the performance measurement data is used to predict potential trouble areas.

28. The performance management controller as claimed in claim 14, further comprising means for enabling the performance management controller to be programmed by a user.

29. The performance management controller as claimed in claim 14, the performance management controller being used in a network management system comprising a plurality of physical or logical components and a performance measurement tool for carrying out performance measurements in the network.

* * * * *

UNITED STATES PATENT AND TRADEMARK OFFICE
CERTIFICATE OF CORRECTION

| | | |
|---|---|---|
| PATENT NO. | : 7,065,324 B2 | Page 1 of 1 |
| APPLICATION NO. | : 10/275925 | |
| DATED | : June 20, 2006 | |
| INVENTOR(S) | : Mee et al. | |

It is certified that error appears in the above-identified patent and that said Letters Patent is hereby corrected as shown below:

Column 7, Line 9, in Claim 5, after "the" insert -- determined --.

Column 8, Line 3, in Claim 17, after "claimed" insert -- in --.

Signed and Sealed this

Eighteenth Day of December, 2007

JON W. DUDAS
*Director of the United States Patent and Trademark Office*